United States Patent [19]
Nakata et al.

[11] Patent Number: 5,258,450
[45] Date of Patent: Nov. 2, 1993

[54] POLYARYLENE SULFIDE RESIN COMPOSITION

[75] Inventors: Akira Nakata; Naoki Yamamoto; Hiroshi Mori, all of Otake; Takuya Ueno, Kobe, all of Japan

[73] Assignee: Mitsubishi Rayon Co., Ltd., Tokyo, Japan

[21] Appl. No.: 469,374

[22] Filed: Jan. 24, 1990

[30] Foreign Application Priority Data

Jan. 27, 1989 [JP] Japan .................. 1-018154
Jan. 31, 1989 [JP] Japan .................. 1-022102

[51] Int. Cl.$^5$ .................. C08K 7/04; C08K 7/14; C08L 81/04
[52] U.S. Cl. .................. 524/588; 524/504; 524/506; 524/609; 525/63; 525/65; 525/474; 525/471; 525/476
[58] Field of Search .................. 525/476, 479, 63, 474, 525/65, 537; 524/588, 609, 504, 506

[56] References Cited

U.S. PATENT DOCUMENTS

| | | | |
|---|---|---|---|
| 4,454,284 | 6/1984 | Ueno et al. | 525/92 |
| 4,528,346 | 7/1985 | Sugie et al. | 525/523 |
| 4,581,411 | 4/1986 | Liang et al. | 525/189 |
| 4,797,448 | 1/1989 | Liang | 525/106 |
| 4,888,390 | 12/1989 | Liang et al. | 525/189 |
| 5,147,947 | 9/1992 | Yamamoto et al. | 525/479 |

FOREIGN PATENT DOCUMENTS

| | | |
|---|---|---|
| 0104543 | 4/1984 | European Pat. Off. . |
| 0142825 | 5/1985 | European Pat. Off. . |
| 367219 | 5/1990 | European Pat. Off. . |
| 59-207921 | 11/1984 | Japan . |
| 61-235462 | 10/1986 | Japan .................. 525/63 |
| 2218996 | 11/1989 | United Kingdom . |

*Primary Examiner*—Ralph H. Dean, Jr.
*Attorney, Agent, or Firm*—Cushman, Darby & Cushman

[57] ABSTRACT

A polyarylene sulfide resin composition obtainable by mixing and reacting (A) 99 to 60 parts by weight of a polyarylene sulfide resin, (B) 1 to 40 parts by weight of a polyorganosiloxane rubber, in which 0.1 to 20 wt. % of a siloxane compound represented by the following formula (I):

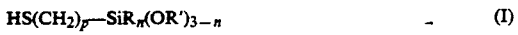

$$HS(CH_2)_p-SiR_n(OR')_{3-n} \qquad (I)$$

wherein R represents a methyl, ethyl, propyl or phenyl group, R' represents a methyl or ethyl group, n represents an integer of 0, 1 or 2, and p represents an integer of 1 to 6, are copolymerized, having an average particle size of 0.1 to 0.5 μm and a degree of swelling of 3 to 50 measured by immersing in toluene, or a polyorganosiloxane graft copolymer prepared by graft-polymerizing a monomer comprising at least one of an unsaturated carboxylic acid and its anhydride to a polyorganosiloxane rubber having an average particle size of 0.1 to 0.5 μm and a degree of swelling of 3 to 50 measured by immersing in toluene, (C) 0.01 to 10 parts by weight, based on 100 parts by weight of the total weight of the components (A) and (B), of at least one polyfunctional compound selected from the group consisting of polyfunctional isocyanate compounds, polyfunctional oxazoline compounds and polyfunctional epoxy compounds, and (D) 0 to 300 wt. %, based on the total weight of the components (A), (B) and (C), of a filler. The composition having excellent impact resistance without a large reduction in the properties inherent to a polyarylene sulfide resin.

12 Claims, No Drawings

POLYARYLENE SULFIDE RESIN COMPOSITION

The present invention relates to a polyarylene sulfide resin composition.

Application fields for the polyarylene sulfide resin composition of the present invention include electrical and electronic parts, particularly surface mounting connectors requiring heat resistance and toughness, as well as mechanical parts, etc.

Polyarylene sulfide resins are recently attracting attention as engineering plastics having excellent heat resistance and chemical resistance.

The conventional polyarylene sulfide resins, however, have drawbacks that they are poor in ductility and fragile.

One method for improving such polyarylene sulfide resins lacking impact resistance is to blend a fibrous filler such as glass fiber, etc. However, the improvement of impact resistance by this method is not satisfactory, there being a demand for the development of higher-level impact resistance.

In the situation like this, there have been proposed various methods for improving the impact resistance of the polyarylene sulfide resins. For example, there are a method of blending the resins with a block copolymer of styrene and butadiene or high-impact polystyrene, as disclosed in Japanese Patent Application Kokai No. 56-118456, and a method of incorporating a polymeric rubber such as silicone rubber, EPR, EPDM, etc. into the resins, as disclosed in Japanese Patent Application Kokai No. 60-120753.

However, the block copolymer of styrene or high-impact polystyrene with butadiene is low in heat resistance. On the other hand, though polyarylene sulfide has excellent heat resistance, it has a molding temperature as high as 300° C. or more, so that such a block copolymer as described above is subject to thermal deterioration under such a molding temperature. As a result, there has been a problem that molded products having excellent performances and surface appearance are difficult to obtain. Further, the method of blending the resins with silicone rubber or EP rubber with an extruder, because of poor incompatibility between the resins and rubber, cannot uniformly disperse the rubber in the resins. The molded product obtained, therefore, were such that a pearly luster is easy to come out on the surface and besides the impact resistance also has not been sufficiently improved.

In view of such a situation, the present inventors have eagerly studied a method for giving excellent impact resistance to a polyarylene sulfide resin without remarkably injuring excellent heat resistance and mechanical properties inherent to the polyarylene sulfide resin and lowering the appearance of the surface of molded products. As a result, the present inventors have found that, by using a particular polyorganosiloxane rubber or a particular polyorganosiloxane graft copolymer as a rubber component, blending the polyarylene sulfide resin with said particular rubber or graft copolymer and at least one polyfunctional compound selected from the group consisting of poly-functional isocyanate compounds, poly-functional oxazoline compounds and polyfunctional epoxy compounds, and reacting the polyfunctional compound, there can be obtained a resin composition which is free from such drawbacks as described above and has remarkably improved impact resistance as well as excellent heat resistance, mechanical properties and moldability. The present inventors thus attained to the present invention.

The present invention relates to a polyarylene sulfide resin composition obtainable by mixing (A) 99 to 60 parts by weight of a polyarylene sulfide resin, (B) 1 to 40 parts by weight of a polyorganosiloxane rubber, in which 0.1 to 20 wt. % of a siloxane compound represented by the following formula (I) are copolymerized, having an average particle size of 0.1 to 0.5 μm and a degree of swelling of 3 to 50 measured by immersing in toluene, or a polyorganosiloxane graft copolymer prepared by graft-polymerizing a monomer comprising at least one of unsaturated carboxylic acids and their anhydrides to a polyorganosiloxane rubber having an average particle size of 0.1 to 0.5 μm and a degree of swelling of 3 to 50 measured by immersing in toluene, (C) 0.01 to 10 parts by weight, based on 100 parts by weight of the total weight of the components (A) and (B), of at least one polyfunctional compound selected from the group consisting of polyfunctional isocyanate compounds, polyfunctional oxazoline compounds and polyfunctional epoxy compounds, and (D) 0 to 300 wt. %, based on the total weight of the components (A), (B) and (C), of a filler, and then reacting these components.

An object of the present invention is to provide a polyarylene sulfide resin having excellent impact resistance.

Other objects and advantages will become apparent from the following description.

The polyarylene sulfide resin used in the present invention is a polymer having as a main constituent unit a repeating unit represented by the formula,

wherein Ar represents

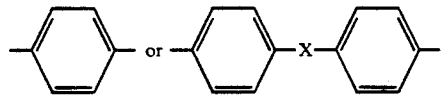

or (in which X represents —SO$_2$—, —CO—, —O— or an alkylene group of which the main chain has 5 or less carbon atoms and may have 0 to 2 methyl side chains bonded thereto), or the above aromatic ring having 1 to 3 halogen atoms, methyl groups or the like as a substituent(s) or the mixture thereof. Among the polyarylene sulfide resins described above, polyphenylene sulfide is more preferably used. These polyphenylene sulfide resins can preferably be used in any of a heat-cross-linked form and a linear form.

The polyorganosiloxane rubber, in which a compound represented by the following formula (I) has been copolymerized, used in the present invention is a copolymer obtained by copolymerizing a monomer giving a linear polyorganosiloxane, a siloxane compound of the formula (I) and a monomer giving a crosslinkable component:

$$HS(CH_2)_p-SiR_n(OR')_{3-n} \qquad (I)$$

wherein R represents a methyl, ethyl, propyl or phenyl group, R' represents a methyl or ethyl group, n represents an integer of 0, 1 or 2, and p represents an integer of 1 to 6.

The monomer giving a linear polyorganosiloxane includes hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, etc. These organosiloxanes are used alone or in admixture of two or more.

The monomer giving a crosslinkable component includes trifunctional or tetrafunctional siloxane monomers such as for example trimethoxymethylsilane, triethoxyphenylsilane, tetramethoxysilane, tetraethoxysilane, tetrabutoxysilane, etc. These monomers may be used alone or in combination. The weight ratio of the monomer giving the linear polyorganosiloxane, the siloxane compound of the formula (I) and the monomer giving the crosslinkable component constituting the polyorganosiloxane rubber is as follows: The proportion of the monomer giving the linear polyorganosiloxane is 50 wt. % or more, preferably 70 wt. % or more, that of the siloxane compound of the formula (I) is 0.1 to 20 wt. %, preferably 0.1 to 10 wt. %, and that of the monomer giving the crosslinkable component is preferably 0.2 to 30 wt. %.

When the amount of the compound of the formula (I) is less than 0.1 wt. %, compositions having the same composition as above except the amount of the compound (I) give only molded products having insufficiently developed impact strength. When said amount exceeds 20 wt. %, the stability of the polyorganosiloxane rubber latex undesirably lowers.

The polyorganosiloxane rubber, in which the compound of the formula (I) has been copolymerized, used in the present invention is obtained by copolymerizing the above three types of monomers.

The polyorganosiloxane rubber used in producing the polyorganosiloxane graft copolymer in the present invention is the same as that mentioned above except that compounds of the following formulae (I), (II) and (III) can be used alone or in combination as a graft-linking agent. That is, said polyorganosiloxane rubber comprises three components, i.e. the linear polyorganosiloxane component, the graft-linking component and the crosslinkable component.

The monomer giving the linear polyorganosiloxane includes hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, etc. These organosiloxanes are used alone or in admixture of two or more.

The graft-linking component referred to herein means an organosiloxane portion having a functional group capable of reacting with a graft branch-forming monomer when the monomer is polymerized in the presence of the rubber. The graft-linking component is formed from the graft-linking agent. The type of graft-linking agent is not critical, if it is organosiloxane having such a functional group. However, those which are represented by the following formulae may be mentioned as preferred ones. These ones also are used alone or in admixture of two or more.

$$HS(CH_2)_p SiR_n(OR')_{3-n} \quad (I)$$

$$CH_2=C(R'')CO_2(CH_2)_p SiR_n(OR')_{3-n} \quad (II)$$

$$CH_2=CHSiR_n(OR')_{3-n} \quad (III)$$

wherein R represents a methyl, ethyl, propyl or phenyl group, R' represents a methyl or ethyl group, R" represents a hydrogen atom or a methyl qroup, n is an integer of 0, 1 or 2, and p represents an integer of 1 to 6.

The monomer giving a crosslinkable component includes trifunctional or tetrafunctional siloxane monomers such as for example trimethoxymethylsilane, triethoxyphenylsilane, tetramethoxysilane, tetraethoxysilane, tetrabutoxysilane, etc. These monomers may be used alone or in combination.

The weight ratio of the monomer giving the linear polyorganosiloxane, the graft-linking agent and the monomer giving the crosslinkable component constituting the polyorganosiloxane rubber is as follows: The proportion of the monomer giving the linear polyorganosiloxane is 50 wt. % or more, preferably 70 wt. % or more, that of the graft-linking agent is 0.1 to 20 wt. %, preferably 0.1 to 10 wt. %, and that of the monomer giving the crosslinkable component is preferably 0.2 to 30 wt. %. The polyorganosiloxane rubber used in producing the polyorganosiloxane graft copolymer in the present invention is obtained by copolymerizing the above three monomers.

Both of these polyorganosiloxane rubbers used in the present invention need to have a degree of swelling of 3 to 50 measured by immersing in toluene. The degree of swelling referred to herein means the proportion of the weight of toluene absorbed in the polyorganosiloxane rubber when this rubber is immersed in toluene and saturated therewith at 25° C. The degree of swelling can be controlled by the kind and amount of the crosslinkable monomer to be copolymerized. When the degree of swelling is less than 3, rubber elasticity does not develop, so that the impact resistance of the polyarylene sulfide resin composition is not sufficiently improved. When the degree of swelling exceeds 50, the rubber cannot keep a rubbery form to result in that the impact resistance of the polyarylene sulfide resin composition is not likewise sufficiently improved.

A method for producing the polyorganosiloxane rubber using these monomers is disclosed in U.S. Pat. Nos. 2,891,920 and 3,294,725.

That is, for producing the polyorganosiloxane rubber, it is desirable to copolymerize the above three types of monomers by shear-mixing a mixture of these monomers together with water in the presence of an emulsifier.

Using alkylbenzenesulfonic acid as an emulsifier is desirable, because this acid acts also to initiate the polymerization of organosiloxane. Further, it is desirable to use metal alkylbenzenesulfonate or metal alkylsulfonate in combination with the alkylbenzenesulfonic acid, because, when the graft copolymerization is carried out, dispersion of the polymer can be kept stable at the step of graft polymerization.

The polyorganosiloxane rubber used in the present invention needs to have an average particle size of 0.1 to 0.5 μ, preferably 0.15 to 0.3 μ. Whether the particle size is beyond the upper limit or below the lower limit of the above range, the impact resistance of the polyarylene sulfide resin composition undesirably tends to lower. The average particle size of the polyorganosiloxane rubber can be controlled by properly selecting a condition wherein water and the mixture of the monomers are shear-mixed before the polymerization.

The polyorganosiloxane graft copolymer used in the present invention is obtained by graft-polymerizing a monomer containing at least one of unsaturated carboxylic acids and their anhydrides to a polyorganosiloxane rubber containing graft-linking component.

Such unsaturated carboxylic acids include acrylic acid, methacrylic acid, maleic acid, maleic acid anhydride, fumaric acid, itaconic acid, etc. Of these, acrylic acid, methacrylic acid and maleic acid anhydride are preferred. These carboxylic acids or their anhydrides can be used alone, but preferably, they are used in admixture with one or more of other copolymerizable monomers. Such monomers include aromatic alkenyls (e.g. styrene, alkylstyrenes (e.g. α-methylstyrene, vinyltoluene), vinylnaphthalene, vinylanthracene), (meth)acrylates, (meth)acrylonitriles, N-substituted maleimides, etc. These monomers may be used alone or in admixture of two or more. Of these monomers, styrene, methyl methacrylate, a mixture of the both and a styrene/acrylonitrile mixture are preferred. The mixing weight ratio of the unsaturated carboxylic acid or its anhydride to other copolymerizable monomer is preferably 1:99 to 40:60. When the amount of the unsaturated carboxylic acids or their anhydrides is below the lower limit of the above range, the impact resistance of the polyarylene sulfide resin composition is only insufficiently improved. Contrary to this, when the amount exceeds the upper limit of the above range, the stability of the latex tends to lower.

Such a polyorganosiloxane graft copolymer is obtained by neutralizing a polyorganosiloxane rubber latex with an alkali, adding the above monomer, and carrying out emulsion polymerization. Said graft copolymer can be separated and recovered by a salting-out and coagulation treatment wherein the latex thus obtained is poured into a hot water containing a dissolved metal salt (e.g. calcium chloride, magnesium sulfate). The polyorganosiloxane graft copolymer thus obtained is a mixture of a free polymer of the above monomers and the graft polymer bonded to the polyorganosiloxane rubber. It is this graft polymer that has a large effect to give impact resistance to the polyarylene sulfide resin composition. From this standpoint, the proportion of bonding of the graft polymer to the polyorganosiloxane rubber, i.e. a ratio of grafting, is preferably 5% or more, more preferably 30% or more. It cannot be helped that the free polymer which is not bonded to the polyorganosiloxane rubber is partly produced at the time of the graft polymerization. However, as small amount as possible of the free polymer is preferred because there is little undesirable possibility to lower the mechanical properties of the molded product. The ratio of the monomer polymerized into the graft copolymer to the total monomer used, i.e. a graft efficiency, depends largely upon the kind of the copolymerized graft-linking agent in the polyorganosiloxane rubber. Consequently, using the siloxane units of the formulae previously described is preferred because a high graft efficiency is obtained.

Considering these ratio of grafting and graft efficiency, the feed ratio of the polyorganosiloxane rubber to the monomer in the graft copolymerization is preferably 10 to 95 wt. % of the former to 90 to 5 wt. % of the latter, more preferably 30 to 90 wt. % of the former to 70 to 10 wt. % of the latter.

Any of the polyorganosiloxane rubber in which the organosiloxane of the formula (I) has been copolymerized and the polyorganosiloxane graft copolymer need to be used in an amount of 1 to 40 parts by weight based on 99 to 60 parts by weight of the polyarylene sulfide resin. When the amount of the polyorganosiloxane rubber or polyorganosiloxane graft copolymer is less than 1 part by weight, development of the impact strength of the composition is insufficient. When the amount exceeds 40 parts by weight, heat resistance lowers.

The polyfunctional isocyanate compound used in the present invention refers to a compound having two or more isocyanate groups. Examples of this compound include tolylene diisocyanate, diphenylmethane diisocyanate, diphenylene diisocyanate, triphenylmethane triisocyanate, hexamethylene diisocyanate, naphthalene diisocyanate, etc. These compounds may be used in admixture of two or more.

The polyfunctional oxazoline compound used in the present invention refers to a compound having two or more oxazoline groups. Examples of this compound include 2,2'-(1,3-phenylene)-bis(2-oxazoline), 2,2'-(1,4-phenylene)-bis(2-oxazoline), etc. These compounds may be used in admixture of two or more.

The polyfunctional epoxy compound used in the present invention refers to a compound having two or more epoxy groups. Examples of this compound include bisphenol-type epoxy compounds such as bisphenol A diglycidyl ether, halogenated bisphenol A diglycidyl ether, etc.; phenol-type epoxy compounds such as cresol novolak polyglycidyl ether, alkylphenol diglycidyl ether, phenolphthalein epoxide, etc.; glycol-type epoxy compounds such as neopentyl glycol diglycidyl ether, polyethylene glycol diglycidyl ether, propylene glycol diglycidyl ether, glycerin triglycidyl ether, etc.; ester-type epoxy compounds such as diglycidyl phthalate, etc.; and triglycidyl isocyanulate, etc. These compounds may be used in admixture of two or more.

The polyfunctional compounds (C) need to be used in an amount of 0.01 to 10 parts by weight, preferably 0.1 to 3 parts by weight based on 100 parts by weight of the total weight of the polyarylene sulfide resin (A) and polyorganosiloxane rubber or polyorganosiloxane graft copolymer (B). When the amount is below the lower limit of the above-mentioned range, development of impact resistance is insufficient. When the amount exceeds the upper limit of the above-mentioned range, flowability lowers.

The composition of the present invention may contain a filler as an additional component.

The filler may have any form of fibrous forms, powdery forms, granular forms and others. Examples of the filler include glass fibers, carbon fibers, potassium titanate, asbestos, silicon carbide, ceramics fibers, metal fibers, silicon nitride, aramide fibers, barium sulfate, calcium sulfate, ferrite, calcium silicate, calcium carbonate, magnesium carbonate, antimony trioxide, zinc oxide, titanium oxide, magnesium oxide, iron oxide, molybdenum disulfide, mica, talc, kaolin, pyrophyllite, bentonite, sericite, zeolite, attapulgite, wollastonite, dolomite, other clays, graphite, gypsum, glass beads, quartz, etc. When these fillers are used, their amount is preferably 300 wt. % or less based on the total amount of the components (A), (B) and (C). When the amount exceeds 300 wt. %, the melt-flowability of the composition becomes poor, and therefore the appearance of the molded product undesirably tends to be lowered. When these reinforcing materials and fillers are used, a known silane coupling agent can be used.

A polyarylene sulfide resin composition of the present invention is obtained by mixing the above (A), (B), (C) and (D) components and then reacting them.

This reaction may be of any form if it is carried out in a mixed state of these components. However, a reaction form of extruding the mixture of these components through an extruder is preferred because the reaction can simply be carried out at the step of pelletizing.

Into the composition of the present invention may be incorporated, if necessary, a mold-release agent, coloring agent, heat stabilizer, ultraviolet ray absorber, foaming agent, rust preventive, flame retardant, flame retarding assistant, etc., so far as the characteristics of the present composition are not much injured.

In the present invention, the degree of swelling of the polyorganosiloxane rubber can be measured by the following method.

A polyorganosiloxane rubber latex is added to about 3 to 5 times by weight, based on the polyorganosiloxane rubber, of isopropyl alcohol with stirring. Thus, the emulsion is broken and the rubber is coagulated to obtain a siloxane polymer. The polymer is washed with water and dried at 80° C. for 10 hours under reduced pressure. After drying, about 1 g of the polymer is accurately weighed, immersed in about 60 g of toluene and swollen by allowing it to stand at 25° C. for 100 hours. Thereafter, the residual toluene is removed by decantation. The swollen polymer is accurately weighed and dried at 80° C. for 16 hours under reduced pressure to vaporize the absorbed toluene. The dried polymer is again weighed accurately. The degree of swelling is calculated according to the following equation:

$$\text{Degree of swelling} = \frac{\left(\begin{array}{c}\text{Weight of}\\\text{swollen polymer}\end{array}\right) - \left(\begin{array}{c}\text{Weight of dried}\\\text{polymer}\end{array}\right)}{(\text{Weight of dried polymer})} \times 100$$

The average particle size of the polyorganosiloxane rubber can be measured using an aqueous dilute dispersion of the rubber latex as a test dispersion, according to the quasi-elastic light scattering method (measuring apparatus, MALVERN SYSTEM 4600; measurement temperature, 25° C.; and scattering angle, 90°).

The present invention will be illustrated in more detail with reference to the following Examples.

However, the present invention should not be construed to be restricted by the Examples.

In Examples and Comparative Eamples, Izod impact strength was measured according to ASTM D 256 (with ⅛" notch) and heat distortion temperature (HDT) was measured according to ASTM D 648 (with a load of 18.56 kg).

In Referential Examples, Examples and Comparative Examples, parts are by weight unless otherwise stated.

REFERENTIAL EXAMPLE 1

2 Parts of tetraethoxysilane, 5 parts of γ-mercaptopropyltrimethoxysilane and 93 parts of octamethylcyclotetrasiloxane were mixed to obtain 100 parts of an organosiloxane mixture. Separately, 1 part of sodium dodecylbenzenesulfonate and 1 part of dodecylbenzenesulfonic acid were dissolved in 200 parts of distilled water. To the aqueous solution was added 100 parts of the above organosiloxane mixture. The obtained mixture was preliminarily stirred at 10,000 rpm with a homomixer, and emulsified and dispersed by passing it three times through a homogenizer under a pressure of 200 kg/cm$^2$. Thus, an organosiloxane latex was obtained. This latex was transferred to a separable flask equipped with a condenser and a stirring blade, heated at 80° C. for 6 hours with stirring, and allowed to stand for 20 hours in a 10° C. atmosphere. Thereafter, the pH of this latex was made 7 with an aqueous sodium hydroxide solution so as to complete polymerization and thus an polyorganosiloxane rubber latex was obtained. The conversion of the resulting polyorganosiloxane rubber was 91.2%, the average particle size thereof was 0.24 μm, and the degree of swelling thereof was 18.

EXAMPLE 1

100 Parts of a polyphenylene sulfide resin (Tohpren T-4 produced by Tohpren Co., Ltd.; average Particle size, 50 μm) moistened with 5 parts of acetone was added to 500 parts of the polyorganosiloxane rubber latex obtained in Referential Example 1 with stirring. Thus, a dispersion was prepared.

This dispersion was coagulated by adding it dropwise to 600 parts of a 1 wt. % aqueous calcium chloride solution. The coagulated product was separated, washed and dried at 80° C. for 10 hours to obtain a polyphenylene sulfide resin in which the polyorganosiloxane rubber had been dispersed. To this resin were added 1 part of triglycidyl isocyanulate and the polyphenylene sulfide resin of such an amount that the content of the polyorganosiloxane rubber became 25 parts per 100 parts of the resin. The mixture was mixed on a Henschel mixer, extruded through a twin-screw extruder (Werner 30 Φ produced by Werner & Pfleiderer Co.) at a barrel temperature of 310° C. and pelletized on a pelletizer. The resulting pellets were molded on an injection molding machine (IS-100 produced by Toshiba Machine Co., Ltd.) at a cylinder temperature of 310° C. and a mold temperature of 140° C. to prepare test pieces for evaluation. Performances were evaluated with these test pieces. The results are shown in Table 1.

EXAMPLES 2 TO 4

Procedure was carried out in the same manner as in Example 1 except that 1 part of triglycidyl isocyanulate was replaced by 0.5 part of diphenylmethane diisocyanate (Example 2), 2 parts of 2,2'-(1,3-phenylene)-bis(2-oxazoline) (Example 3) or 3 parts of EPIKOTE 828 (a bisphenol-type compound produced by Shell Petroleum Co.) (Example 4). The results are shown in Table 1.

EXAMPLES 5 TO 8

60 Parts each of the pellets obtained in Examples 1 to 4 was blended with 40 parts of glass fibers, and each mixture was extruded through a 40 Φ single screw extruder at a barrel temperature of 310° C. and pelletized on a pelletizer. Injection-molding and evaluation of performance were carried out in the same manner as in Example 1 except that each pellet prepared above was used.

EXAMPLES 9 AND 10

In Example 9, 60 parts of the pellets obtained in Example 1 was blended with 20 parts of glass fibers and 20 parts of powdery silica (Fuselex E-1 produced by Tatsumori Co., Ltd.), and in Example 10, 75 parts of the same pellets as above was blended with 25 parts of powdery silica. Thereafter, in the same manner as in Example 5, each blend was pelletized and injection-molded, and the test pieces obtained were evaluated. The results are shown in Table 1.

TABLE 1

| Example | Izod impact strength (kg · cm/cm)) | HDT (°C.) |
| --- | --- | --- |
| 1 | 25 | 108 |
| 2 | 23 | 107 |
| 3 | 22 | 108 |
| 4 | 22 | 106 |
| 5 | 18 | 253 |
| 6 | 17 | 252 |
| 7 | 17 | 252 |
| 8 | 17 | 253 |
| 9 | 15 | 251 |
| 10 | 8 | 188 |

REFERENTIAL EXAMPLE 2

A polyorganosiloxane rubber was obtained in the same manner as in Referential Example 1 except that 5 parts of γ-mercaptopropyltriethoxysilane was replaced by 5 parts of ε-mercaptopentylmethyldimethoxysilane. The conversion was 92%, the degree of swelling was 19 and the average particle size was 0.23 μm.

EXAMPLE 11

In the same manner as in Example 1, the polyorganosiloxane rubber obtained in Referential Example 2 was blended with the polyphenylene sulfide resin and triglycidyl isocyanulate, and the blend was extruded and molded to obtain test pieces. Evaluation was similarly carried out using the test pieces. Izod impact strength was 24 kg·cm/cm, and HDT was 108° C.

EXAMPLES 12 TO 20

In the same manner as in Example 1, blending, extrusion and molding were carried out using the compounds shown in Table 2 in place of 1 part of triglycidyl isocyanulate used in Example 1. Evaluation was carried out using the test pieces obtained. The results are collectively shown in Table 2.

EXAMPLES 21 TO 23

The pellets obtained in Example 1 and the fillers shown in Table 3 were blended, pelletized and injection-molded to prepare test pieces. Evaluations were carried out using these test pieces. The results are collectively shown in Table 3.

TABLE 2

| Example | Kind of polyfunctional compound (part) | Izod impact strength (kg · cm/cm) | HDT (°C.) |
| --- | --- | --- | --- |
| 12 | Tolylene diisocyanate (1.0) | 23 | 107 |
| 13 | Diphenylene diisocyanate (1.0) | 24 | 107 |
| 14 | Triphenylmethane triisocyanate (0.75) | 23 | 108 |
| 15 | Hexamethylene diisocyanate (2.0) | 21 | 106 |
| 16 | Naphthalene diiscocyanate (1.0) | 23 | 106 |
| 17 | 2,2'-(1,4-Phenylene)-bis(2-oxazoline) (2.0) | 22 | 107 |
| 18 | Cresol novolak polyglycidyl ether (epoxy equivalent, 210) (3.0) | 21 | 105 |
| 19 | Neopentyl glycol diglycidyl ether (1.0) | 22 | 106 |

TABLE 2-continued

| Example | Kind of polyfunctional compound (part) | Izod impact strength (kg · cm/cm) | HDT (°C.) |
| --- | --- | --- | --- |
| 20 | Diglycidyl phthalate (1.0) | 22 | 106 |

TABLE 3

| Example | Pellet obtained in Example 1 (part) | Filler (part) | Izod impact strength (kg · cm/cm) | HDT (°C.) |
| --- | --- | --- | --- | --- |
| 21 | 40 | GF 60 | 13 | 253 |
| 22 | 70 | GF 30 | 16 | 250 |
| 23 | 70 | CF 30 | 11 | 250 |

Note:
GF: Glass fiber
CF: Carbon fiber

REFERENTIAL EXAMPLE 3

2 Parts of tetraethoxysilane, 2 parts of γ-methacryloyloxypropyldimethoxymethylsilane and 96 parts of octamethylcyclotetrasiloxane were mixed to obtain 100 parts of an organosiloxane mixture. Separately, 1 part of sodium dodecylbenzenesulfonate and 1 part of dodecylbenzenesulfonic acid were dissolved in 200 parts of distilled water. To the aqueous solution was added 100 parts of the above organosiloxane mixture. The obtained mixture was preliminarily stirred at 10,000 rpm with a homomixer, and emulsified and dispersed with a homogenizer under a pressure of 200 kg/cm$^2$ to obtain an organosiloxane latex. This latex was transferred to a separable flask equipped with a condenser and a stirring blade, heated at 80° C. for 5 hours with stirring and allowed to stand in a 20° C. atmosphere. After 24 hours, the latex was neutralized to a pH of 7 with an aqueous sodium hydroxide solution so that polymerization was completed, and a polyorganosiloxane rubber latex was obtained. The conversion of the resulting polyorganosiloxane rubber was 91.3%, the average particle size thereof was 0.22 μm, and the degree of swelling was 18.

200 Parts of the resulting polyorganosiloxane rubber latex and 1 part of sodium dodecylbenzensulfonate were put in a separable flask equipped with a stirrer. After replacing the air in the flask by nitrogen, the rubber latex was heated to 70° C. Thereafter, a mixed solution of 35 parts of styrene, 5 parts of methacrylic acid and 0.16 part of tert-butyl peroxide was added to the rubber latex, and the mixture was stirred for 30 minutes. Further, a mixed solution comprising 0.2 part of Rongalit, 0.0004 part of ferrous sulfate, 0.0008 part of disodium ethylenediaminetetraacetate and 5 parts of distilled water was added to start radical polymerization. The reaction temperature was kept for 3 hours and cooled to complete the polymerization. The conversion of the styrene/methacrylic acid copolymer at the time of graft polymerization was 96%, and the ratio of grafting of the resulting graft copolymer was 52%. The obtained graft copolymer latex was added dropwise to 456 parts of a hot water containing 1.5 wt. % of calcium chloride, whereby the graft copolymer was coagulated. The coagulated product was separated, washed and dried at 75° C. for 10 hours to obtain the dry powder of the graft copolymer (S-1).

REFERENTIAL EXAMPLE 4

Using a polyorganosiloxane rubber latex prepared in the same manner as in Referential Example 1, graft polymerization was carried out in the same manner as in Referential Exxample 3 except that monomers of compositions shown in Table 4 were used. Thus, the dry powder of a graft copolymer was obtained. The conversion and ratio of grafting of the monomers at the graft polymerization are shown in Table 4.

TABLE 4

| Polyorgano-siloxane rubber latex (part) | St | MAA | MMA | Maleic anhydride | AN | Conversion of monomer | Ratio of grafting (%) |
|---|---|---|---|---|---|---|---|
| S-2 | 300 | 8 | 2 | — | — | — | 92 | 8 |
| S-3 | 200 | — | 5 | 35 | — | — | 95 | 51 |
| S-4 | 300 | — | 5 | 8 | — | — | 93 | 8 |
| S-5 | 200 | 35 | — | — | 5 | — | 95 | 50 |
| S-6 | 200 | 28 | 4 | — | — | 8 | 95 | 51 |

MMA: Methyl methacrylate
MAA: Methacrylic acid

EXAMPLES 24 TO 47

A polyphenylene sulfide resin (Tohpren T-4 produced by Tohpren Co., Ltd.), the polyorganosiloxane graft copolymers (S-1) to (S-6) obtained in Referential Examples 3 and 4 and the polyfunctional isocyanate, polyfunctional oxazoline or polyfunctional epoxy compounds shown in Table 5 were mixed in proportions shown in Table 5 on a Henschel mixer. When a glass fiber (hereinafter referred to as GF) was to be added as a filler, it was added in an amount shown in Table 5. The resulting mixture was extruded through a twin-screw extruder (Werner 30 Φ) at a barrel temperature of 310° C. and then pelletized on a pelletizer. The pellets obtained were molded on an injection-molding machine (IS-100 produced by Toshiba Machine Co., Ltd.) at a cylinder temperature of 310° C. and a mold temperature of 140° C. to prepare test pieces for evaluation. The results of evaluation are shown in Table 5.

TABLE 5

| Example | Rubber Type | Rubber Part | PPS (part) | MDI (part) | PBO (part) | TGI (part) | EPIKOTE (part) | GF (part) | Izod impact strength (kg·cm/cm) | HDT (°C.) |
|---|---|---|---|---|---|---|---|---|---|---|
| 24 | S-1 | 16.6 | 83.4 | 1 | | | | | 23 | 108 |
| 25 | S-2 | 11.1 | 88.9 | 1 | | | | | 20 | 113 |
| 26 | S-3 | 16.6 | 83.3 | 1 | | | | | 22 | 109 |
| 27 | S-4 | 11.1 | 88.9 | 1 | | | | | 21 | 114 |
| 28 | S-5 | 16.6 | 83.4 | 1 | | | | | 23 | 109 |
| 29 | S-6 | 16.6 | 83.4 | 1 | | | | | 22 | 108 |
| 30 | S-1 | 16.6 | 83.4 | | 1 | | | | 20 | 108 |
| 31 | S-1 | 16.6 | 83.4 | | | 0.5 | | | 25 | 108 |
| 32 | S-2 | 11.1 | 88.9 | | | 0.5 | | | 22 | 113 |
| 33 | S-3 | 16.6 | 83.4 | | | 0.5 | | | 24 | 108 |
| 34 | S-4 | 11.1 | 88.9 | | | 0.5 | | | 23 | 113 |
| 35 | S-5 | 16.6 | 83.4 | | | 0.5 | | | 24 | 109 |
| 36 | S-6 | 16.6 | 83.4 | | | 0.5 | | | 24 | 108 |
| 37 | S-1 | 16.6 | 83.4 | | | | 1 | | 23 | 107 |
| 38 | S-1 | 16.6 | 83.4 | 1 | | | | 66.7 | 16 | 250 |
| 39 | S-1 | 8.3 | 91.7 | 1 | | | | 66.7 | 13 | 201 |
| 40 | S-1 | 25 | 75 | 1 | | | | 66.7 | 20 | 230 |
| 41 | S-2 | 22.2 | 77.8 | 1 | | | | 66.7 | 19 | 251 |
| 42 | S-1 | 16.6 | 83.4 | 1 | | | | 150 | 13 | 252 |
| 43 | S-1 | 16.6 | 83.4 | 1 | | | | 43 | 16 | 250 |
| 44 | S-1 | 16.6 | 83.4 | | | 0.5 | | 66.7 | 17 | 251 |
| 45 | S-1 | 8.3 | 91.7 | | | 0.5 | | 66.7 | 14 | 260 |
| 46 | S-1 | 25 | 75 | | | 0.5 | | 66.7 | 20 | 230 |
| 47 | S-2 | 22.2 | 77.8 | | | 0.5 | | 66.7 | 20 | 250 |

PPS: Polyphenylene sulfide
TGI: Triglycidyl isocyanulate
MDI: Diphenylmethane diisocyanate
EPIKOTE: EPIKOTE 828
PBO: 2,2'-(1,3-Phenylene)-bis(2-oxazoline)

EXAMPLES 48 TO 52

The compositions of the present invention were obtained by blending the polyorganosiloxane graft copolymer (S-1) obtained in Referential Example 3 and materials shown in Table 6.

TABLE 6

| Example | Rubber Type | Rubber Part | PPS (part) | Triglycidyl isocyanulate (part) | Talc | Powdery silica (part) | GF | CF | Izod impact strength (kg·cm/cm) | HDT (°C.) |
|---|---|---|---|---|---|---|---|---|---|---|
| 48 | S-1 | 16.6 | 83.4 | 0.5 | 33.3 | | 33.3 | | 14 | 250 |
| 49 | S-1 | 16.6 | 83.4 | 0.5 | | 33.3 | 33.3 | | 15 | 250 |
| 50 | S-1 | 16.6 | 83.4 | 0.5 | 33.3 | | | | 7 | 183 |
| 51 | S-1 | 16.6 | 83.4 | 0.5 | | 33.3 | | | 8 | 180 |

TABLE 6-continued

| Example | Rubber Type | Rubber Part | PPS (part) | Triglycidyl isocyanulate (part) | Talc | Powdery silica (part) | GF | CF | Izod impact strength (kg · cm/cm) | HDT (°C.) |
|---|---|---|---|---|---|---|---|---|---|---|
| 52 | S-1 | 16.6 | 83.4 | 0.5 | | | | 43 | 11 | 248 |

Note.
CF: carbon fiber
Talc: Hi-filler -
2 (produced by Tsuchiya Kaolin Industries Co.)
Powdery silica: Fuselex E-1 (produced by Tatsumori Co., Ltd.).

REFERENTIAL EXAMPLE 5

Using tetraethoxysilane, the graft-linking agents shown in Table 7 and octamethylcyclotetrasiloxane in amounts shown in Table 7, polyorganosiloxane rubbers were prepared by the same polymerization method as in Referential Example 3 except that the emulsification and dispersion by a homogenizer were carried out using the pressure and the number of passages through the homogenizer shown in Table 7. Subsequently, the dry powders of graft copolymers were obtained in the same manner as in Referential Example 3 except that the polyorganosiloxane rubbers obtained above were used. The results of evaluation are shown in Table 7.

TABLE 7

| | Tetraethoxy-silane (part) | Graft-linking agent (part) A | B | C | Octamethylcyclo-tetrasiloxane (part) | Homogenizer Pressure (kg/cm$^2$) | Number of passages | Conversion of monomer | Degree of swelling | Particle size ($\mu$m) |
|---|---|---|---|---|---|---|---|---|---|---|
| S-7 | 2 | 2 | | | 96 | 200 | 3 | 91 | 18 | 0.19 |
| S-8 | 2 | 2 | | | 96 | 100 | 1 | 91 | 18 | 0.30 |
| S-9 | 1 | 2 | | | 97 | 200 | 1 | 91 | 25 | 0.23 |
| S-10 | 2 | | 2 | | 96 | 200 | 1 | 91 | 18 | 0.21 |
| S-11 | 2 | | | 2 | 96 | 200 | 1 | 91 | 17 | 0.22 |

Note:
A: γ-Methacryloyloxypropylmethyldimethoxysilane
B: γ-Mercaptotrimethoxysilane
C: Vinyltrimethoxysilane

EXAMPLES 53 TO 62

The compositions of the present invention were obtained in the same manner as in Example 1 except that the powdery graft copolymers obtained in Referential Example 5, PPS and the polyfunctional compounds and a filler shown in Table 8 were used in amounts shown in Table 8. Molding and evaluation were also carried out similarly. The results are shown in Table 8.

TABLE 8

| Example | Rubber Type | Rubber Part | PPS (part) | MDI | TMI | NDI | TGI (part) | GF (part) | Izod impact strength (kg · cm/cm) | HDT (°C.) |
|---|---|---|---|---|---|---|---|---|---|---|
| 53 | S-7 | 16.6 | 83.4 | 1 | | | | 66.7 | 14 | 250 |
| 54 | S-8 | 16.6 | 83.4 | 1 | | | | 66.7 | 15 | 250 |
| 55 | S-9 | 16.6 | 83.4 | | 0.5 | | | 66.7 | 17 | 250 |
| 56 | S-10 | 16.6 | 83.4 | | 0.5 | | | 66.7 | 15 | 251 |
| 57 | S-11 | 16.6 | 83.4 | | | 1 | | 66.7 | 15 | 251 |
| 58 | S-7 | 16.6 | 83.4 | 1 | | | 0.5 | 66.7 | 15 | 251 |
| 59 | S-8 | 16.6 | 83.4 | | 1 | | 0.5 | 66.7 | 16 | 250 |
| 60 | S-9 | 16.6 | 83.4 | | | | 0.5 | 66.7 | 18 | 250 |
| 61 | S-10 | 16.6 | 83.4 | | | | 0.5 | 66.7 | 17 | 251 |
| 62 | S-11 | 16.6 | 83.4 | | | | 0.5 | 66.7 | 17 | 251 |

Note:
MDI: Diphenylmethane diisocyanate
TMI: Triphenylmethane triisocyanate
NDI: Naphthalene diisocyanate
TGI: Triglycidyl isocyanulate

EXAMPLE 63

Using the polyorganosiloxane rubber obtained in Referential Example 2, graft polymerization, coagulation and drying were carried out in the same manner as in Referential Example 3 to obtain the dry powder of a graft copolymer (S-7). A blend of the same composition as in Example 24 was prepared using this dry powder, pelletized and molded. The results of evaluation is that Izod impact strength was 21 kg·cm/cm and HDT was 107° C.

EXAMPLES 64 TO 72

Blends of the same composition as in Example 24 were prepared using the compounds shown in Table 9 in place of 1 part of diphenylmethane diisocyanate. The blends were pelletized and molded in the same manner as in Example 1 to obtain test pieces. The results of evaluation are collectively shown in Table 9.

TABLE 9

| Example | Kind of polyfunctional compound (part) | Izod impact strength (kg · cm/cm) | HDT (°C.) |
|---|---|---|---|
| 64 | Tolylene diisocyanate (1.5) | 22 | 107 |
| 65 | Diphenylene diisocyanate (1.0) | 21 | 106 |
| 66 | Triphenylmethane triisocyanate (0.5) | 21 | 106 |
| 67 | Hexamethylene diisocyanate | 20 | 108 |

TABLE 9-continued

| Example | Kind of polyfunctional compound (part) | Izod impact strength (kg · cm/cm) | HDT (°C.) |
|---|---|---|---|
| 68 | (2.0) Naphthalene diisocyanate (1.0) | 22 | 107 |
| 69 | 2,2'-(1,4-Phenylene)-bis(2-oxazoline) (2.0) | 20 | 106 |
| 70 | Cresol novolak polyglycidyl ether (epoxy equivalent, 210) (3.0) | 23 | 105 |
| 71 | Neopentyl glycol diglycidyl ether (1.0) | 22 | 106 |
| 72 | Diglycidyl phthalate (1.0) | 21 | 106 |

EXAMPLE 73

A polyorganosiloxane graft copolymer was prepared in the same manner as in Referential Example 3 except that acrylic acid was used for graft polymerization in place of methacrylic acid. A blend of the same composition as in Example 24 was prepared using this graft copolymer, pelletized and molded. The results of evaluation is that Izod impact strength was 22 kg·cm/cm and HDT was 107° C.

EXAMPLES 74 AND 75

Pelletizing, injection molding and evaluation were carried out in the same manner as in Examples 1 and 5 except that a straight chain-type polyphenylene sulfide resin (M-2588 produced by Toray Phillips Co.) was used. The results are shown in Table 10.

TABLE 10

| Example | Izod impact strength (kg · cm/cm) | HDT (°C.) |
|---|---|---|
| 74 | 30 | 107 |
| 75 | 21 | 251 |

COMPARATIVE EXAMPLES 1 TO 8

For comparison, extrusion, pelletizing and injection molding were carried out in the same manner as in Example 1 except that the polyphenylene sulfide resin alone (Tohpren T-4 produced by Tohpren Co., Ltd.) was used, and that if necessary, the fillers (in Table 11) were added to the resin in amounts shown in the same table. The performances of the compositions were evaluated. The results are shown in Table 11.

TABLE 11

| Comparative Example | PPS (part) | Talc | Powdery silica (part) | GF | Izod impact strength (kg · cm/cm) | HDT (°C.) |
|---|---|---|---|---|---|---|
| 1 | 100 | | | | 3 | 115 |
| 2 | 100 | | | 66.7 | 8 | 263 |
| 3 | 100 | | | 150 | 6 | 265 |
| 4 | 100 | | | 43 | 7 | 263 |
| 5 | 100 | 33.3 | | 33.3 | 5 | 262 |
| 6 | 100 | | 33.3 | 33.3 | 5 | 263 |
| 7 | 100 | 33.3 | | | 2 | 205 |
| 8 | 100 | | 33.3 | | 2 | 203 |

Note:
Talc: Hi-filter 2 produced by Tsuchiya Kaolin Industries Co.
Powdery silica: Fuselex E-1 (produced by Tatsumori Co., Ltd.).

COMPARATIVE EXAMPLE 9

Blending, pelletizing, and molding were carried out in the same manner as in Example 1 except that triglycidyl isocyanulate was not added. The results of evaluation is that Izod impact strength was 6 kg·cm/cm, and HDT was 103° C.

REFERENTIAL EXAMPLE 6

A polyorganosiloxane rubber was prepared in the same manner as in Referential Example 1 except that a mixture comprising 2 parts of tetraethoxysilane and 98 parts of octamethylcyclotetrasiloxane was used as the organosiloxane mixture. The conversion was 92.0%, the degree of swelling of the rubber was 20, and the particle size thereof was 0.24 μm.

COMPARATIVE EXAMPLES 10 TO 12

Procedures were carried out in the same manner as in Examples 1 to 3 except that the polyorganosiloxane rubber obtained in Referential Example 6 was used in place of that obtained in Referential Example 1. The results of evaluation are shown in Table 12.

TABLE 12

| Comparative Example | Izod impact strength (kg · cm/cm) | HDT (°C.) |
|---|---|---|
| 10 | 6 | 106 |
| 11 | 6 | 105 |
| 12 | 6 | 105 |

COMPARATIVE EXAMPLES 13 AND 14

Procedures were carried out in the same manner as in Examples 24 and 38 except that diphenylmethane diisocyanate was not used. The results are shown in Table 13.

TABLE 13

| Comparative Example | Izod impact strength (kg · cm/cm) | HDT (°C.) |
|---|---|---|
| 13 | 8 | 107 |
| 14 | 10 | 250 |

COMPARATIVE EXAMPLE 15

Using the polyorganosiloxane rubber prepared in Referential Example 6, graft polymerization, coagulation and drying were carried out in the same manner as in Referential Example 3 to obtain a dry powder. A blend of the same composition as in Example 24 was prepared using this dry powder, pelletized and molded. The results of evaluation is that Izod impact strength was 7 kg·cm/cm, and HDT was 107° C.

What is claimed is:
1. A polyarylene sulfide resin composition comprising the reaction product of:
(A) 99 to 60 parts by weight of a polyarylene sulfide resin,
(B) 1 to 40 parts by weight of a polyorganosiloxane graft copolymer prepared by graft-polymerizing a monomer comprising at least one of an unsaturated carboxylic acid or its anhydride to a polyorganosiloxane rubber having an average particle size of 0.1 to 0.5 μm and a degree of swelling of 3 to 50 measured by immersing in toluene,
(C) 0.01 to 10 parts by weight, based on 100 parts by weight of the total weight of the components (A)

and (B), of at least one polyfunctional compound selected from the group consisting of polyisocyanate compounds, polyoxazoline compounds and polyepoxy compounds, wherein the present composition also comprises 0 to 300 wt. %, based on the total weight of the components (A), (B) and (C), of a filler.

2. A polyarylene sulfide resin composition according to claim 1, wherein the polyarylene sulfide resin is a polyphenylene sulfide resin.

3. A polyarylene sulfide resin composition according to claim 1, wherein the unsaturated carboxylic acid or its anhydride is at least one member selected from the group consisting of acrylic acid, methacrylic acid and maleic acid anhydride.

4. A polyarylene sulfide resin composition according to claim 1, wherein, in producing the polyorganosiloxane graft copolymer, the polyorganosiloxane rubber used for graft polymerization contains a graft-linking component.

5. A polyarylene sulfide resin composition according to claim 4, wherein the graft-linking component is formed from at least one member selected from the group consisting of compounds represented by the following formulae:

$$HS(CH_2)_p SiR_n(OR')_{3-n}$$

$$CH_2=C(R'')CO_2(CH_2)_p SiR_n(OR')_{3-n} \text{ and}$$

$$CH_2=CHSiR_n(OR')_{3-n}$$

wherein R represents a methyl, ethyl, propyl or phenyl group, R' represents a methyl or ethyl group, R" represents a hydrogen atom or a methyl group, n is an integer of 0, 1 or 2, and p represents an integer of 1 to 6.

6. A polyarylene sulfide resin composition according to claim 1, wherein the polyfunctional compound is a polyisocyanate compounds.

7. A polyarylene sulfide resin composition according to claim 6, wherein the polyisocyanate compounds is at least one member selected from the group consisting of tolylene diisocyanate, diphenylmethane diisocyanate, diphenylene diisocyanate, triphenylmethane triisocyanate, hexamethylene diisocyanate and naphthalene diisocyanate.

8. A polyarylene sulfide resin composition according to claim 1, wherein the polyfunctional compound is a polyoxazoline compounds.

9. A polyarylene sulfide resin composition according to claim 8, wherein the polyoxazoline compounds is at least one member selected from the group consisting of 2,2'-(1,3-phenylene)-bis(2-oxazoline) and 2,2'-(1,4-phenylene)-bis(2-oxazoline).

10. A polyarylene sulfide resin composition according to claim 1, wherein the polyfunctional compound is a polyepoxy compounds.

11. A polyarylene sulfide resin composition according to claim 10, wherein the polyepoxy compounds is at least one member selected from the group consisting of bisphenol A diglycidyl ether, halogenated bisphenol A diglycidyl ether, cresol novolak polyglycidyl ether, alkylphenol diglycidyl ether, phenolphthalein epoxide, neopentyl glycol diglycidyl ether, polyethylene glycol diglycidyl ether, propylene glycol diglycidyl ether, glycerin triglycidyl ether, diglycidyl phthalate and triglycidyl isocyanulate.

12. A polyarylene sulfide resin composition according to claim 1, wherein the filler is a glass fiber or carbon fiber.

* * * * *